Figure 1:
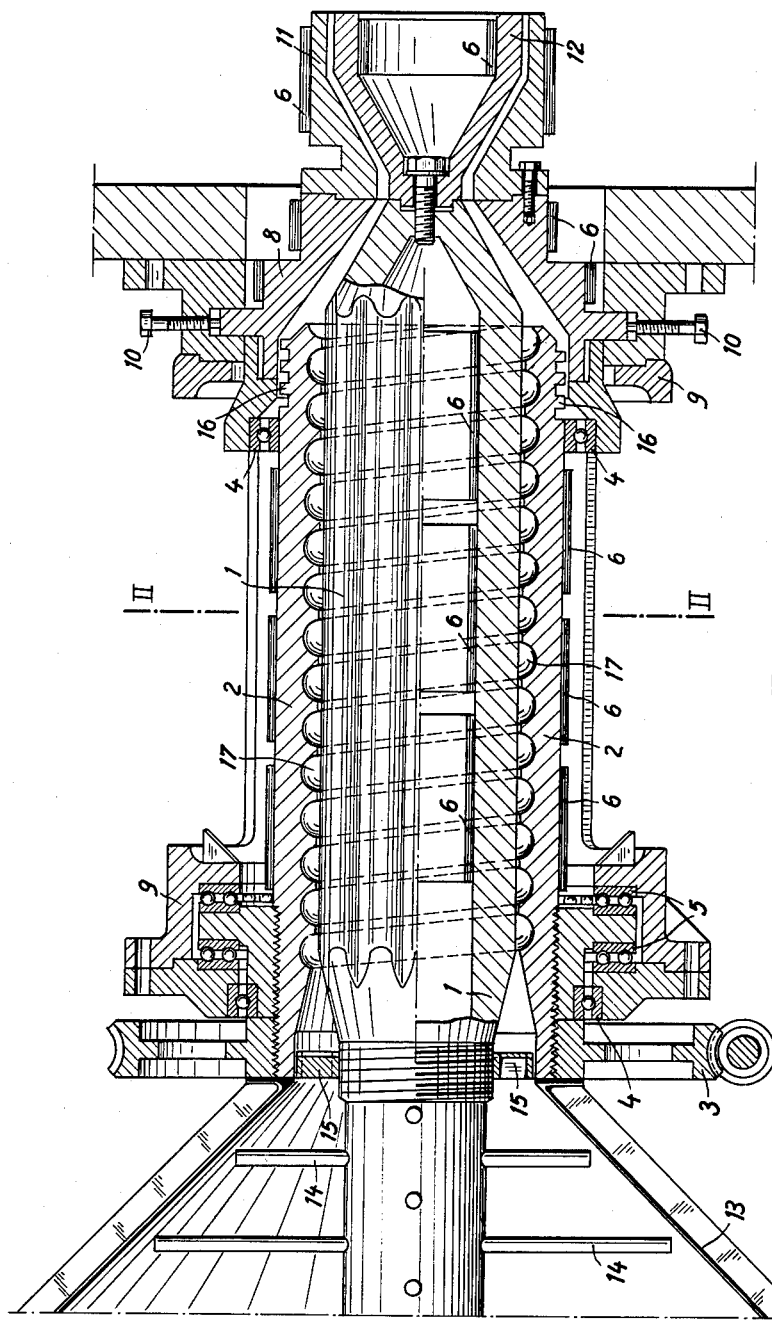

Inventor
Jean Joseph Gérard Daubenfeld
By his attorneys
Howson and Howson

United States Patent Office 3,203,048
Patented Aug. 31, 1965

3,203,048
CYLINDER PRESSES, ESPECIALLY FOR WORKING UP SYNTHETIC SUBSTANCES
Jean Joseph Gérard Daubenfeld, 12 Rue Astrid, Luxembourg, Luxembourg
Filed Dec. 7, 1962, Ser. No. 243,098
Claims priority, application Luxembourg, Feb. 12, 1962, 41,235
7 Claims. (Cl. 18—14)

The invention relates to a cylinder press, especially for working up primarily thermoplastic synthetic substances as well as for producing tubes, sections, foils, cable sheathings and the like, and comprising a housing with a cylindrical space and a core, to which housing the material to be worked is fed at one end and forced out at the other end through a nose tool or spraying head.

The known machines of this type have a worm as core and are constructed as single or twin form presses. They are known as single or double worm extruders. The outer casing forming the worm cylinder is stationary and connected with the parts carrying the machine, whereas the worm rotates as internal core. The worm thread is given a different profile according to the synthetic substance to be worked. The synthetic substance or material is conveyed through the machine by the rotation of the worm and the friction of the material against the inner wall of the cylinder. In the case of double screw presses the conveyance of the material is effected by the intermeshing of the screw threads of the two worms.

In the known extruders the so-called nose tools are fitted on the stationary cylinder, the inner parts of these tools, that is in the case of tubular tools the displacement body, inner mandrel or the like, being carried by a mandrel holder which is clamped in the parts of the outer casing. The mandrel holder having the shape of a star is located in the cross-section through which the synthetic substance is extruded.

According to the invention, the casing forming the cylindrical space is rotatable in relation to the core in the direction of the extrusion of the synthetic substance, the surfaces of the cylinder and of the core facing each other being so shaped that, through the rotation of the casing in relation to the core, the material is moved to the extrusion end and forced out.

The core may be absolutely stationary so that only the casing forming the cylindrical space is rotatable.

The rotating cylindrical casing may be provided with internal peripheral screw threads which can be in the form of grooves or depressions in the casing wall.

The surface of the core is preferably shaped to hold back the material and may be, for example corrugated around its circumference along its longitudinal axis. The surface of the core thus shaped cooperatively with relation to the screw threads on the inner wall of the cylindrical casing not only helps to convey the material through the cylinder but also exerts a very good and intensive, kneading, mixing and shearing effect on the material.

In the press according to the invention, the core of the spraying or extrusion head may be fitted on the stationary inner core of the press and the mouthpiece of this head on a stationary headpiece with which the rotary cylinder casing engages. This construction presents a very great advantage because it enables one to produce without difficulty tubes having, for example, very large internal diameter. Above all, the flow-technical difficulties which exist in the known single and double worm presses owing to the necessary connection of the mouthpiece and core of the extrusion head, are overcome.

It is advisable to provide on the outer side of the end of the rotating cylinder casing engaging the stationary headpiece, screw threads which tend to screw into the headpiece. These screw threads prevent the synthetic substance from creeping through the gap between the headpiece and the end of the rotary cylinder casing engaging therein under the action of the pressure head or propelling pressure.

The headpiece is preferably mounted between screws radially arranged for centering.

A particular advantage of the invention consists in that the general construction of the cylinder press is simplified and can be of shorter length than heretofore. It is possible to employ the press for general purposes. Thus for example blow foils, cable sheathings and the like of relatively large diameter can be produced without difficulty. It is no longer necessary to deflect the synthetic substance in an angle head.

Figure 2:
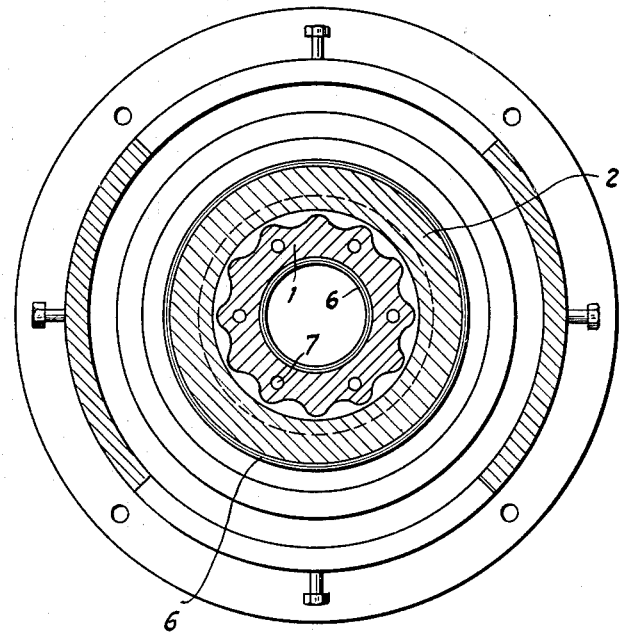
Figure 3:
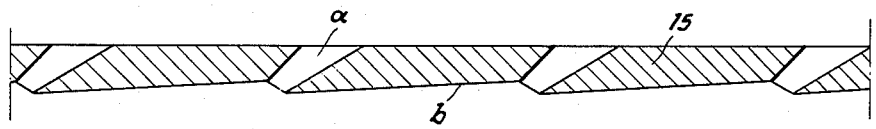

An embodiment of the invention is illustrated by way of example in the accompanying drawings, in which:

FIG. 1 shows a cylinder press in longitudinal section;
FIG. 2 is a section taken on line II—II of FIG. 1, and
FIG. 3 is a section showing the plate provided on the feed end of the press, in developed state.

The cylinder press according to the invention comprises a core 1 in the form of a hollow cylinder which is stationary and connected with the machine frame and consequently does not move. The core 1 is located in a hollow cylinder 2 which is rotatably mounted and intended to carry out uniform rotary movement. For the drive, the hollow cylinder 2 is equipped wtih a worm wheel 3 with which a worm engages. The worm may be driven by an infinitely variable speed motor or some similar gearing. It is naturally also possible to substitute for the worm gear some other type of gear, suuch as a wedge belt drive, bevel wheels or the like.

The hollow cylinder 2 is mounted on ball bearings 4 or roller bearings in the part of the machine designated by 9. Thrust ball bearings 5 are provided for taking up the axial forces.

In the interior of the hollow core 1 as well as on the outer side of the hollow cylinder 2 electric heating sleeves 6 may be provided. The temperature regulation of this heating system can be effected in the same way as in the known cylinder presses. Some other means may, however, also be employed, for example, with the aid of a suitable liquid.

For cooling the hollow core 1 passages may be provided in its wall for the circulation of a cooling liquid. Instead of such a system of passages, a hollow aluminum cylinder might be arranged through which a cooling liquid flows and which cylinder is provided within the core under the sleeves themselves. Similarly a cooling tube system might also be provided. The hollow cylinder 2 may be cooled in the same way as the hollow core.

Screw threads 17 are provided in the inner wall of the hollow cylinder 2 in the form of depressions or grooves of rounded cross-sectional shape. The outer surface of the core 1 is corrugated around its circumference along its longitudinal axis, as shown in FIG. 2. As the hollow cylinder 2 rotates, the material or synthetic substance is kneaded, mixed, cut and transported by the cooperation of the screw threads 17 with the circumferential corrugations of the core, the transport being effected by the resistance of the material on the core.

In the case of the example illustrated, a tubular molding tool 11, 12 is provided as spraying or extrusion head. The core or inner part 12 of this tool is fitted on the end of the stationary core 1 of the press, while the mouthpiece 11 is fixed on the stationary headpiece 8. The headpiece and the mouth 11 are each equipped with electric heating jackets 6. An electric heating jacket or sleeve is also arranged in the stationary inner part 12 of the extrusion head. The extrusion head is changeable.

The headpiece 8 is mounted on the machine frame by means of radial screws 10. It can thus be accurately centered with the aid of these radial screws.

The output end of the rotating hollow cylinder 2 engages the headpiece 8. This engaging end is provided with screw threads formed by ribs 16 which exert a screw effect in the headpiece 8 during the rotation of the said hollow cylinder and prevent the synthetic substance from creeping back in the gap between the rotating hollow cylinder 2 and the headpiece 8.

On the feed end of the hollow cylinder 2 a funnel 13 is fixed for receiving the raw synthetic substance. This funnel rotates with the hollow cylinder. On the core 1 a plate 15 is fitted which remains stationary therewith and is provided with slits $a$. These slits are inclined in the direction of the movement of rotation. The side of the plate 15 facing the interior of the hollow cylinder 2 has sloping surfaces $b$. These impart a force component acting on the material located on the feed side between the core and the hollow cylinder, in the direction of the path of feed.

Radial arms 14 are fitted on the stationary cylinder core 1. These arms engage the rotating pulverulent or granulated material and facilitate the feeding operation of the press while avoiding caking.

I claim:

1. A cylinder press for working up thermoplastic synthetic substances into tubular form, comprising
    a housing having a cylindrical space with two open ends, and a stationary core therein, into which cylindrical space material to be worked up is fed at one end and extruded at the other end,
    an extrusion head on the extrusion end of the cylindrical space,
    a cylindrical casing rotatably fitted in the cylindrical space around the stationary core,
    longitudinally oriented corrugations on the stationary core to restrain the advance of material in the press,
    and cross-sectionally rounded screw threads on the core-facing surface of the casing to advance material in the press.

2. A cylinder press according to claim 1, wherein there is an inner part of the extrusion head which acts as a molding element which inner part is fitted on the stationary core and wherein there is an outer part acting as mouthpiece of the molding element which outer part is mounted on a stationary headpiece in which the cylindrical casing rotates.

3. A cylinder press according to claim 2, wherein the cylindrical casing has on its outer periphery and at the end most proximate the stationary headpiece screw threads tending to screw into the headpiece.

4. A cylinder press according to claim 3, wherein the headpiece has radially arranged centering screws.

5. A cylinder press for working up thermoplastic synthetic substances into tubular form comprising
    a housing having a cylindrical space with two open ends and a stationary core therein,
    a cylindrical casing rotatably fitted in the cylindrical space around the stationary core, between which rotatable casing and stationary core material to be worked up is fed at one end and extruded at the other end,
    cross-sectionally rounded screw threads on the core-facing surface of the rotatable casing to advance material in the press,
    longitudinally oriented corrugations on the stationary core to restrain the advance of material in the press,
    a stationary headpiece in which the casing rotates, on the extrusion end of the housing,
    a two element extrusion head for the press consisting of an inner unit fixedly mounted to the stationary core, and an outer unit fixedly mounted to the stationary headpiece,
    centering screws arranged radially around the headpiece,
    a feed funnel on the feed input end of the press,
    a plate between the feed funnel and the rotatable casing, having passages to admit the material to be worked up, which passages are inclined in the direction of the rotary movement of the press,
    and sloping surfaces on that side of the plate facing the rotatable casing, to exert moments of force to help advance the material to be worked up.

6. An extruder for processing and forming synthetic substances, comprising a rotating press cylinder having peripheral screw threads formed on the inner surface thereof, a stationary cylinder core positioned inside said cylinder and having axially aligned ribs on its outer surface, and stationary means including a mouthpiece, at the output end of said cylinder for moulding said substances; said cylinder core being supported and clamped against movement at one end, and provided at the other end with a fixedly attached extrusion head core positioned within but free from said mouthpiece, said core and said mouthpiece together forming a die for shaping said substances as they emerge from the extruder.

7. An extruder for processing and forming synthetic substances comprising, a rotating press cylinder having peripheral screw threads on the inner surface thereof, a stationary cylinder core positioned inside said cylinder and having axially aligned ribs on its outer surface, a stationary headpiece at the output end of said cylinder, one end of said headpiece surrounding the radially outer portion of the output end of said press cylinder, there being screw threads on said outer portion of said cylinder for preventing synthetic substances from creeping between said cylinder and said one headpiece end, the other end of said headpiece having a mouthpiece mounted thereon, said cylinder core being clamped against movement at one end and being provided at its output end with a fixedly attached extrusion head core positioned within but free from said mouthpiece, said extrusion head core and said mouthpiece together forming a die for shaping said substances as they emerge from the extruder.

References Cited by the Examiner

UNITED STATES PATENTS

| | | | |
|---|---|---|---|
| 1,904,884 | 4/33 | Royle | 18—12 |
| 2,051,688 | 8/36 | Dunsheath. | |
| 2,183,959 | 12/39 | Dunsheath. | |
| 2,200,997 | 5/40 | Royle. | |
| 2,547,151 | 4/51 | Braeseke | 18—12 |
| 2,639,464 | 5/53 | Magerkwith | 18—12 |
| 2,787,022 | 4/57 | Chisolm | 18—12 |
| 3,008,187 | 11/61 | Slade | 18—14 |

WILLIAM J. STEPHENSON, *Primary Examiner.*

MICHAEL V. BRINDISI, *Examiner.*